United States Patent [19]

Kosaka

[11] Patent Number: 5,068,906
[45] Date of Patent: Nov. 26, 1991

[54] PROCESSOR FOR EXTRACTING AND MEMORIZING CELL IMAGES

[75] Inventor: Tokihiro Kosaka, Hyogo, Japan

[73] Assignee: Toa Medical Electronics Co., Ltd., Kobe, Japan

[21] Appl. No.: 329,005

[22] Filed: Mar. 27, 1989

[30] Foreign Application Priority Data

Apr. 22, 1988 [JP] Japan ................................. 63-99490

[51] Int. Cl.$^5$ .............................................. G06K 9/20
[52] U.S. Cl. .......................................... 382/48; 382/6; 364/413.08
[58] Field of Search .............................. 382/6, 48, 9; 364/413.08; 356/39

[56] References Cited

U.S. PATENT DOCUMENTS 4,741,045 4/1988 Denning ................................ 384/48

Primary Examiner—Leo H. Boudreau
Assistant Examiner—Steven P. Fallan
Attorney, Agent, or Firm—Fitch, Even, Tabin & Flannery

[57] ABSTRACT

In an apparatus for extracting individual cell images in an original imaged frame by means of windows and storing the extracted individual cell images in an editing memory, a window setting memory is constituted by a plurality of bits corresponding to respective ones of a plurality of the cell images. Coordinates of each pixel in the imaged frame are used as addresses of the window setting memory.

2 Claims, 11 Drawing Sheets

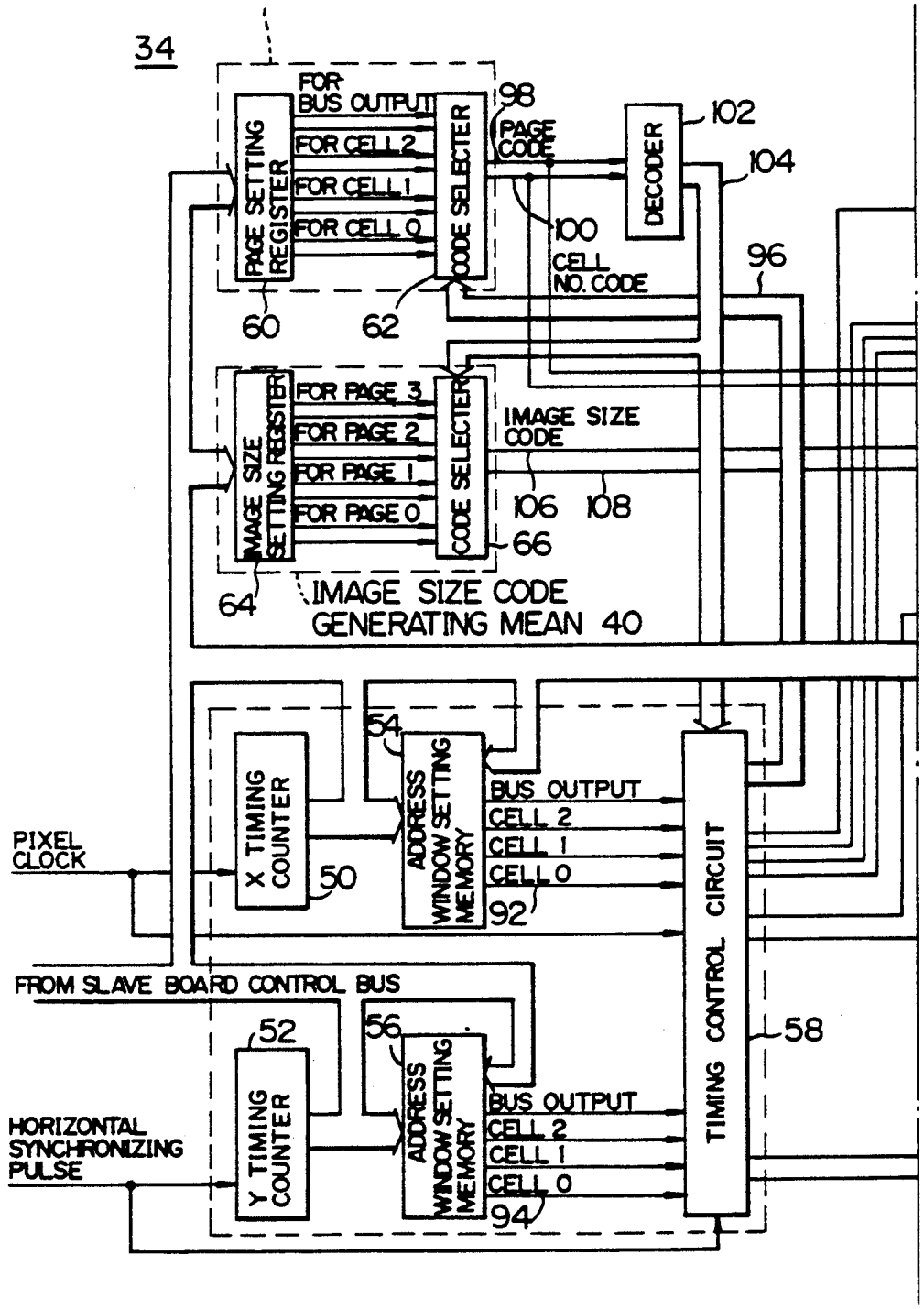

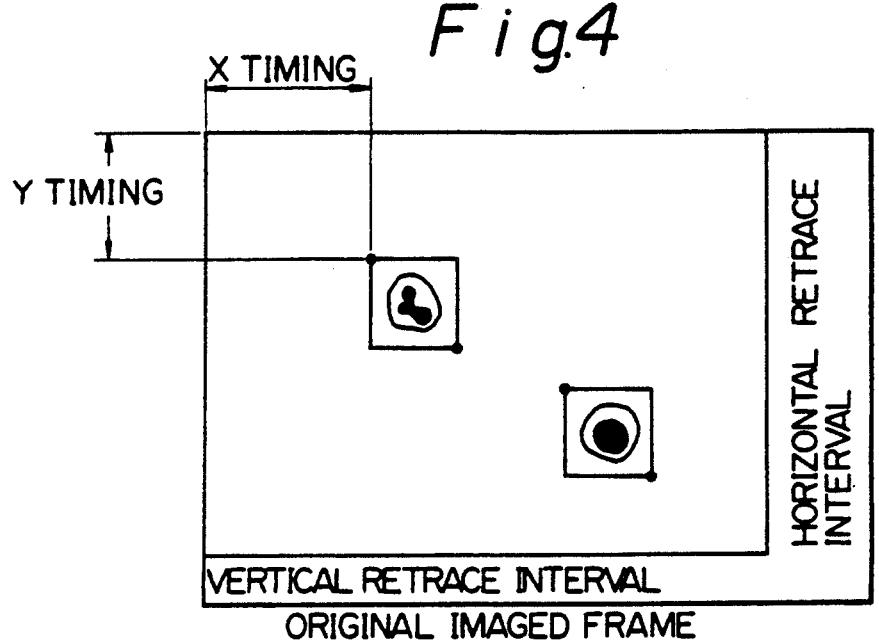
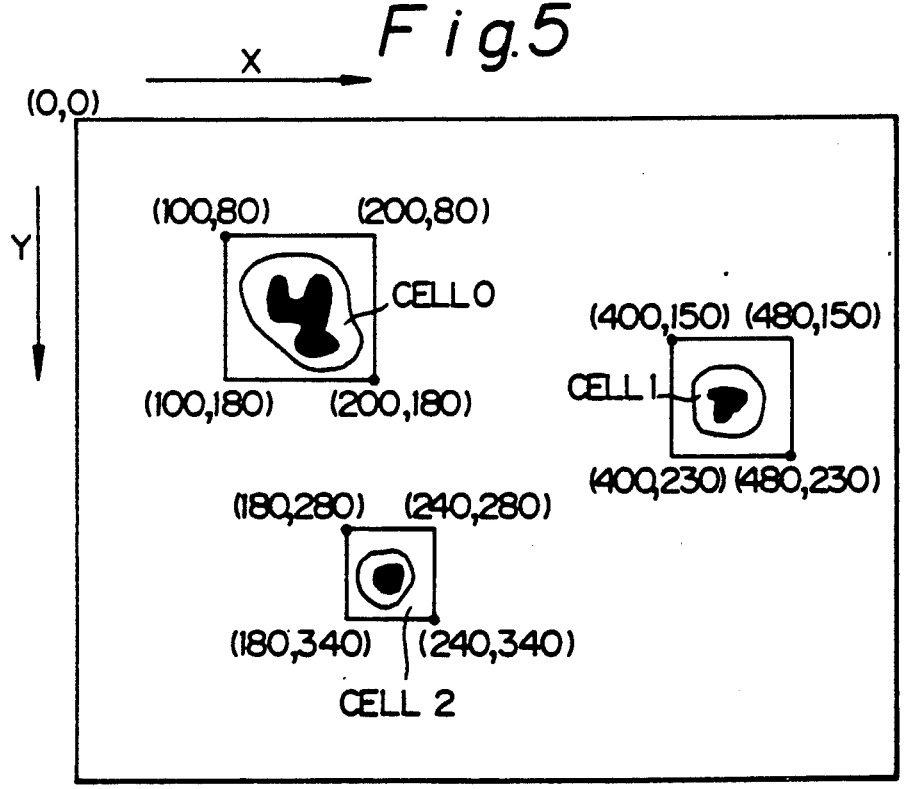

Fig. 6

| | D3 | D2 | D1 | D0 | |
|---|---|---|---|---|---|
| ADDRESS X=0 | 0 | 0 | 0 | 0 | |
| ADDRESS X=100 | 0 | 0 | 0 | 1 | (STARTING POINT OF WINDOW FOR CELL 0) |
| ADDRESS X=180 | 0 | 1 | 0 | 0 | (STARTING POINT OF WINDOW FOR CELL 2) |
| ADDRESS X=200 | 0 | 0 | 0 | 1 | END POINT OF WINDOW FOR CELL 0 |
| ADDRESS X=240 | 0 | 1 | 0 | 0 | (END POINT OF WINDOW FOR CELL 2) |
| ADDRESS X=400 | 0 | 0 | 1 | 0 | (STARTING POINT OF WINDOW FOR CELL 1) |
| ADDRESS X=480 | 0 | 0 | 1 | 0 | (END POINT OF WINDOW FOR CELL 1) |

Fig. 7

| | D3 | D2 | D1 | D0 | |
|---|---|---|---|---|---|
| ADDRESS Y=0 | 0 | 0 | 0 | 0 | |
| ADDRESS Y=80 | 0 | 0 | 0 | 1 | (STARTING POINT OF WINDOW FOR CELL 0) |
| ADDRESS Y=150 | 0 | 0 | 1 | 0 | (STARTING POINT OF WINDOW FOR CELL 1) |
| ADDRESS Y=180 | 0 | 0 | 0 | 1 | (END POINT OF WINDOW FOR CELL 0) |
| ADDRESS Y=230 | 0 | 0 | 1 | 0 | (END POINT OF WINDOW FOR CELL 1) |
| ADDRESS Y=280 | 0 | 1 | 0 | 0 | (STARTING POINT OF WINDOW FOR CELL 2) |
| ADDRESS Y=340 | 0 | 1 | 0 | 0 | (END POINT OF WINDOW FOR CELL 2) |

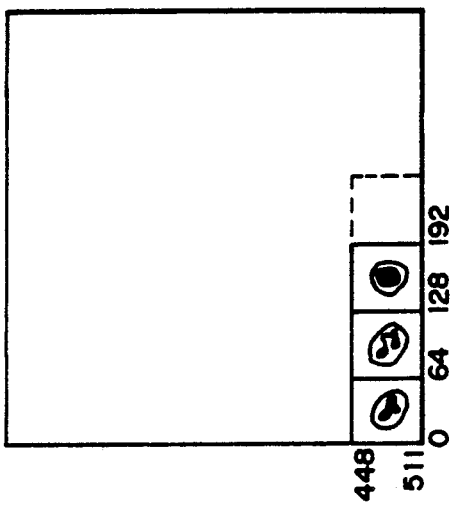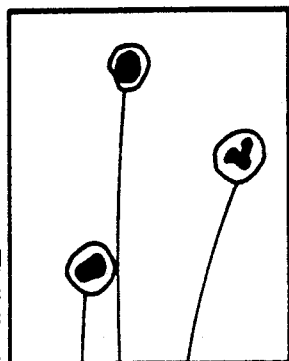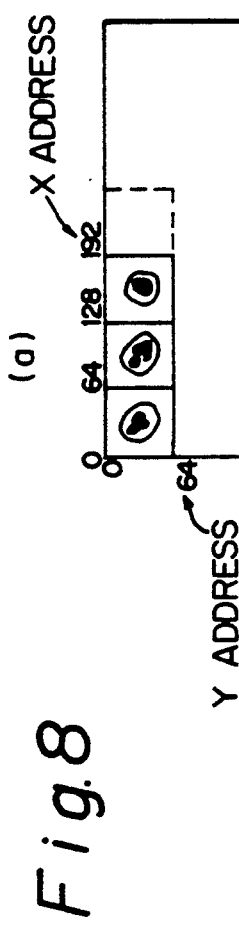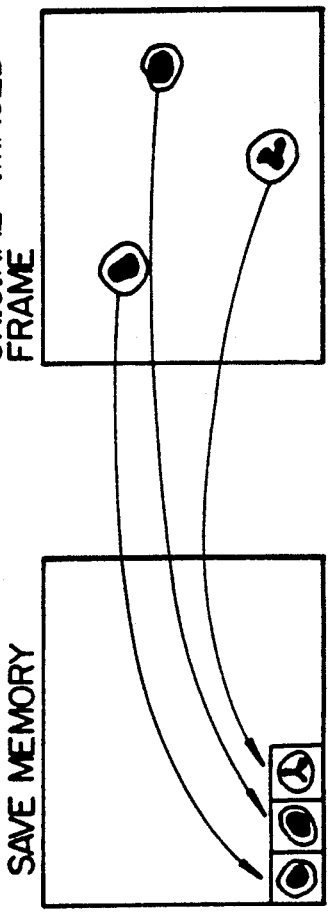
Fig. 8
Fig. 9

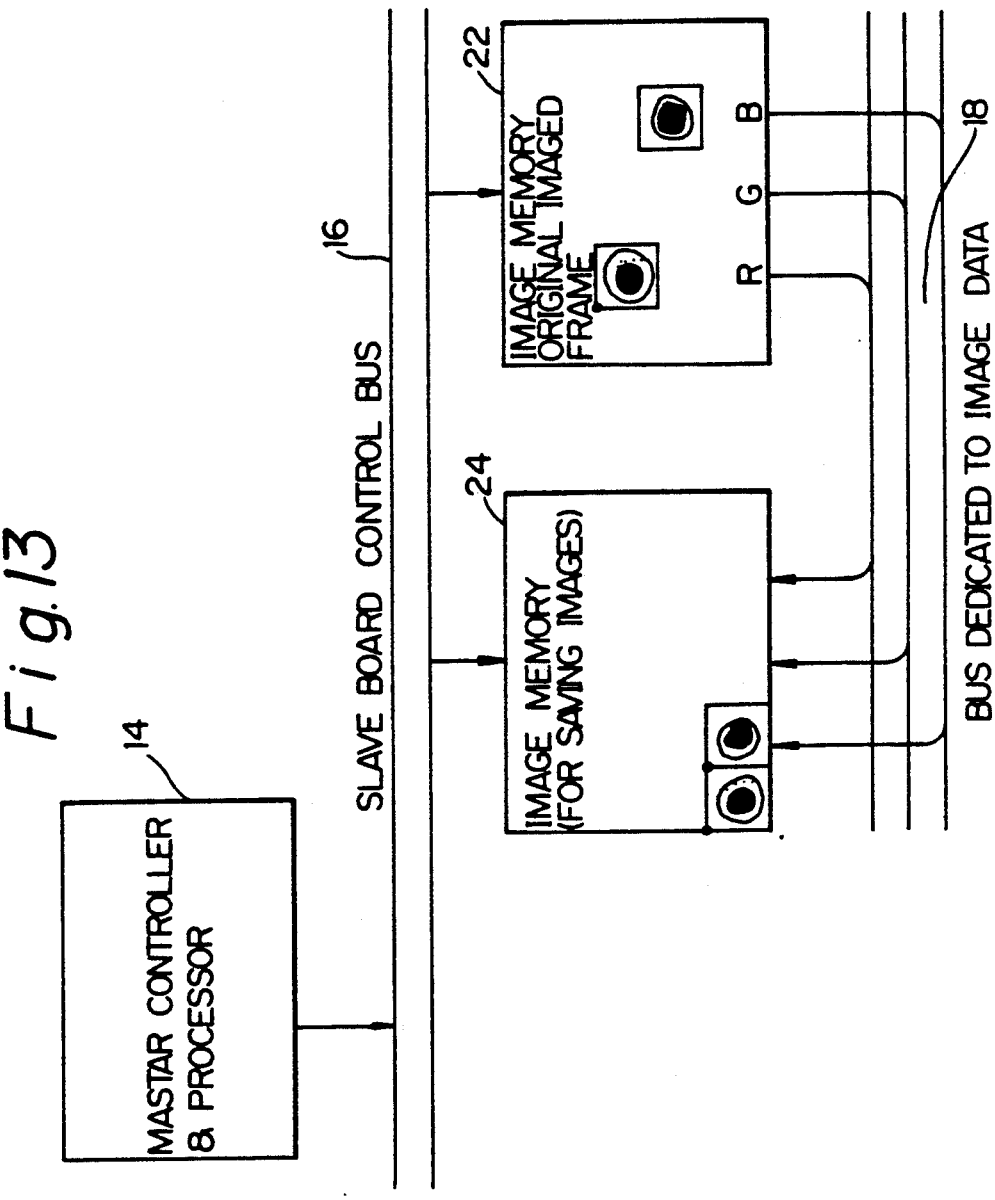

PROCESSOR FOR EXTRACTING AND MEMORIZING CELL IMAGES

BACKGROUND OF THE INVENTION

This invention relates to a cell image processing system having a bus dedicated to image data. More particularly, the invention relates to a processing method and apparatus for extracting and memorizing cell images in which, even if a number of cells are present in a single imaged frame, a number of cell images can be processed efficiently in one frame cycle from information relating to the positions at which the cells reside.

The general architecture of an image processing apparatus having a bus dedicated to image data, as well as the operation of this apparatus, will now be described in simple terms.

FIG. 1 is a block diagram illustrating an example of an image processing apparatus having a bus dedicated to image data.

The apparatus includes a general-purpose microcomputer 12 which functions as the overall host processor of the system, a plurality of slave boards for processing an image in hardware fashion, and a master controller & processor 14 for controlling the operation and function of the slave boards. More specifically, each board is operated by having its operating mode, function and parameters set by the master controller & processor 14 via a slave board control bus 16. The boards are usually interconnected via a six-to-nine channel bus 18 dedicated to image data, with an eight-bit bus serving as one channel.

The data on the dedicated bus flows in the manner of a time series identical with that of a raster scan system in television, and one-sixtieth of a second is required to deliver all of the data in a single image frame. In other words, the bus dedicated to the image data employs horizontal and vertical synchronization as the timing base, and random accessing for a single image frame of data cannot be performed via the data bus 18. Because the dedicated bus uses vertical synchronization as a timing base, the processing performed by the boards connected thereto also has the vertical synchronization period (one-sixtieth of a second) as a single processing cycle. Accordingly, the setting of the operating mode, function and parameters of the slave boards by the master controller & processor is ordinarily carried out during the vertical blanking period. The master controller & processor not only controls the slave boards in accordance with an image processing request from the general-purpose microcomputer but also functions to compute such characterizing parameters as the cell edge trace, cell image area and perimeter of the cell images based on data obtained through processing performed by an image processor board 20. Futhermore, it is also possible for the master controller & processor to randomly access the contents of image memory boards 22, 24 via the slave board control bus, ascertain the position at which a cell appears, read the image data pertaining solely to this portion and compute other characterizing parameters.

The general operation of the common image processing apparatus set forth above will now be described taking as an example a case in which a still picture of cells flowing in a planar sheath is captured and the cells are classified in accordance with type by means of image processing.

A planar sheath flow refers to a flow having a thickness the same as that of the thickest particle among the particles of interest and a width which is a number of times greater than that of the widest particle, e.g., a width which can be 100 times greater or more, wherein the flow is such that the particles of interest in the flow will not overlap one another in the direction of the thickness. Examples of an apparatus in which a planar sheath flow is realized are disclosed in the specifications of Japanese Patent Publication No. 57-500995 and U.S. Pat. No. 4,338,024.

In order to acquire a still picture of cells in a planar sheath flow, strobe light or pulsed laser light having a short emission time is made to irradiate the flow in the thickness direction thereof, and an image is formed on the image pickup surface of a video camera (color camera) via an objective lens. The camera outputs analog signals resolved into the three colors R (red), G (green) and B (blue). These are fed into an image input board 28 which subjects them to an analog/digital (A/D) conversion. The resulting digital R, G and B data is stored in an image memory board 22 via a three-channel image data bus. At the same time, the data is inputted also to the image processor board 20, which executes preprocessing to determine whether a cell is in view and to detect the edge of the cell. Preprocessing entails extracting an average value of, e.g., G (green) and B (blue) data at each point (pixel) of an image and forming a histogram of the entire image frame in realtime. The data processed by the image processor board 20 is stored in the image memory board 24 via the dedicated bus 18. Though the method in which the two image memory boards 22, 24 are used is not particularly limited, in the present description the image memory board 22 is used to store original image data and the image memory board 24 is employed to store data which has been processed.

In one vertical retrace interval the master controller & processor 14 checks the histogram prepared in the image processor board 20 and determines whether a cell is present in a single image frame. If it is decided that no cell is present, then the program of the master controller & processor 14 returns to processing for the next new imaged frame. When a cell is found to exist, the program proceeds to the next image processing step. An example of the next image processing step would be processing for subtracting previously stored background data from the image data, preparing a histogram from the results obtained, digitizing the image data as preprocessing for the purpose of tracing the edge of a cell, and detecting the cell edge. The resulting edge detection data is stored in the image memory board via the bus dedicated to image data. By way of example, edge detection information might include eight-bit data made to correspond to each pixel of a single image frame, in which pixels that take on values other than 0 are regarded as cell edge points and the direction in which the next neighboring cell edge point is located is indicated by the particular value. When this processing is completed, the master controller and processor 14 refers to the edge detection information in the image memory board via the slave board control bus 16, and the edge of each and every cells traced by means of a microprogram. At the same time, computations for the area and perimeter of each cell, cumulative chromaticity information and shape parameters are performed. Each cell is then classified based on the characterizing parameters obtained.

In a system in which it is required to save (store) images of the cells observed, processing is necessary in which the position occupied by each cell in the frame is determined from the results of edge traces for each cell, only those regions of the original frame in which cells are present are extracted, and the regions are gathered together in accordance with each cell class and saved in the memory. The cell image data saved in accordance with each class is inputted to a display processor board 30 via the dedicated bus 18 and is displayed on a color monitor 32.

This completes the brief description of image processing performed by an image processing apparatus having a bus dedicated to image data.

A problem which the present invention attempts to solve concerns cell image extracting and memorizing processing in which processing for extracting and saving (storing) a number of captured cell images, as shown in FIG. 9, can be performed in a highly efficient manner.

Basically, the cell image extracting and memorizing processing mentioned above is performed in the following manner: From the results of the edge tracing of each cell, the master controller & processor ascertains the area in which each cell is present in one original imaged frame stored in the image memory. Ordinarily, this area is expressed by a perfect square, within which the data is transferred to another image memory so as to be saved. Though there are several ways in which the transfer can be performed, two typical examples of conventional methods will now be described.

PRIOR-ART METHOD I

Upon determining the area in which each cell image is present, the master controller & processor 14 expresses the area in the form of a perfect square, accesses the image memory storing the original imaged frame, reads only the image data within the area out onto the slave board control bus 16 pixel by pixel, and temporarily stores the data in the register of the master controller & processor board. Next, with regard to the other image memory board for saving the cell image, the image data accepted by the register of the master controller & processor board is placed on the slave board control bus 16 and is written in the save memory 22. The flow of this series of processing steps is indicated by (1) through (4) in FIG. 10. This processing will now be described.

(1) A memory address in which is stored the image data about to be transferred is set in the original image memory 22 via the slave board control bus 16.

(2) One pixel data of this cell image portion to be transferred is read out on the slave board control bus 16 and the data is transferred to the register within the master controller & processor board 14.

(3) An address at which the image is to be saved is set in the image memory 24, which is for saving the cell image, via the slave board control bus 16.

(4) The data in the register of the master controller & processor 14 is placed on the slave board control bus 16 and written in the image memory 24 to save the cell image.

Repeatedly executing the foregoing steps (1) through (4) results in the transfer and editing of the cell image portion alone.

A disadvantage encountered in this processing method is that the image data transfer rate is slow, as a result of which several microseconds of time is required to transfer one pixel data of the portion. For example, in order to transfer 64×64 pixels of data for the three colors R (red), G (green) and B (blue), 20 to 30 milliseconds would be required. This length of time is greater than a vertical synchronizing cycle of 16.7 ms. This makes it impossible to carry out pipeline processing and realtime processing for a captured image that changes every one-sixtieth of a second. Hence, the advantage of providing the bus dedicated to image data is lost. Though transfer within one-sixtieth of a second is possible in a case where a 32×32 pixel portion is acceptable as the transfer area, a transfer time in excess of one-sixtieth of a second would be needed if a large number of cells are present in one captured frame.

Another disadvantage of the foregoing method is that a greater load is placed upon the master controller & processor. The limitation on the processing capability of the master controller & processor limits the processing capability of the entire image processing system, so that the provision of the bus dedicated to image data loses its meaning. Originally, the advantage of the dedicated bus is that it makes possible greater diversification of processing, parallel processing and pipeline operation by allowing several processor boards and image memory boards to be connected to the bus when necessary, thereby making realtime processing feasible even with regard to an image that changes every one-sixtieth of a second.

PRIOR-ART METHOD II

This method is implemented by providing the image memory boards with a window access function. As shown in FIG. 11, a window refers to a time-related region which is based on horizontal and vertical synchronizing signals.

A window function is one which places image data on the image data-dedicated bus only in the window period, or one which picks up data on the image data-dedicated bus and stores it in the memory only in the window period. Which portion of the image data is to be placed on the image data-dedicated bus or at which address of the save image memory data picked up from this bus is to be written in accordance with the window function is designated by setting beforehand a physical image memory address corresponding to an initial pixel of the window in an address counter of the image memory board from the master controller & processor during the vertical retrace interval.

FIG. 12 is a block diagram exemplifying a prior-art arrangement in which the window function is implemented using presettable (preset) counters as address counters. This circuitry is provided in the image memory board 22 or 24. All of the circuitry of FIG. 12 is necessary for specifying one window. Specifying a number of windows will require an equal number of identical sets of this circuitry.

The circuitry includes preset counters 200, 202, 204, 206 for X offset, Y offset, X window width and Y window width, respectively. These preset values are set in the preset counters 200, 202, 204, 206 via a bus line 208 connected to the slave board control bus 16. The preset values of the respective preset counters 200, 202, 204, 206 are calculated in accordance with the following formulae from the values of the X offset, Y offset, X window width and Y window width shown in FIG. 11:

(MAXIMUM COUNTABLE VALUE OF COUNTER)−(X OFFSET VALUE)

(MAXIMUM COUNTABLE VALUE OF COUNTER)−(Y OFFSET VALUE)

(MAXIMUM COUNTABLE VALUE OF COUNTER)−(X WINDOW WIDTH VALUE)

(MAXIMUM COUNTABLE VALUE OF COUNTER)−(Y WINDOW WIDTH VALUE)

By way of example, if the X offset value is 100 and the maximum countable value of the counter is 1024, then 924 (1024−100) is set in the preset counter 200. If the X window width value is 300, then 724 (1024−300) is set in the preset counter 204.

A pixel clock enters the preset counters 200 and 204 via a line 210, and horizontal synchronizing pulses enter the preset counters 202 and 206 via a line 212. Carry out signals from the preset counters 200, 202, 204, 206 enter a logic circuit 222 via respective lines 214, 216, 218, 220. The logic circuit 222 delivers count-enable signals to the preset counters 204, 206 via respective lines 224, 226 and outputs, from a line 228, a signal indicative of the window period.

In operation, the preset value relating to the X offset and the preset value relating to the X window width are set in the preset counters 200, 204, respectively, in the horizontal blanking time (period). The setting of values in the preset counters 202, 206 is performed in the vertical blanking period. When the above-mentioned preset values have been set in the preset counters for each horizontal line, the preset counter 200 begins counting the pixel clock. The preset counter 204 does not begin counting at this time because the count-enable signal from the logic circuit 222 is initially in a disable state. When the preset counter 200 counts a number of pixel clock pulses equivalent to its preset X offset value, the counter 200 delivers the carry out signal on line 214. Thus, on the basis of the numerical values cited above as examples, the preset value is 924, so that the carry out signal is outputted when 100 of the pixel clock pulses (namely 100 pixels) are counted and the maximum countable value 1024 is attained. When the carry out signal is received from the preset counter 200, the logic circuit 222 places the count-enable signal in the count enabling state and delivers the signal to the preset counter 204 via line 224. In response, the preset counter 204 is placed in the count-enable state and begins counting the pixel clock. In the case of the numerical values cited above as examples, the preset value of the preset counter 204 is 724, so that the carry out signal is delivered to line 218 when 300 of the pixel clock pulses (namely 300 pixels) are counted and the maximum countable value 1024 of the counter is attained. In response, the logic circuit 222 outputs the window period signal indicative of residence within the window period. A cell image is transferred and stored in the memory during the time that the window period signal is being delivered on line 228. This output of the window period is performed every horizontal line within the Y window width. The counting of the Y offset value and Y window width value is carried out using the preset counters 202, 206 in the same manner as the counting of the X offset value and X window width value.

The window access function is implemented using the address counters of the kind described above. A method of transferring and editing a cell image using this window access function will now be described in simple terms with reference to FIG. 13.

(1) A memory address corresponding to the initial pixel (indicated by the black dot in FIG. 13) in the cell image area to be transferred is set in the original image memory 22. (since the flow of image data on an image bus is the same as that in a television raster scanning manner, the initial pixel referred to above is a pixel located in the upper left-hand corner of the image area.)

(2) The timing for transfer of the above-mentioned image area is set, with horizontal synchronization and vertical synchronization being the timing bases. In other words, the X offset, X window width, Y offset and Y window width are set.

(3) An initial memory address at which the image is to be written is set in the image memory 24, this being for the purpose of saving the cell image. (Ordinarily, this address is decided in such a manner that when the image is subsequently displayed on the color monitor 32 via the bus 18 dedicated to image data and the display processor board 30, the image will appear at a convenient display position.

(4) The timing at which the data in the image area is to be picked up from the bus dedicated to the image data is set. Specifically, the parameters for window designation are set just as in (2) above. Basically, values the same as those set in (2) above will suffice, but the X offset value that is set takes into consideration time delay in the horizontal direction ascribable to the transfer time.

The settings of steps (1) through (4) are all performed in the vertical blanking period by the master controller & processor via the slave board control bus 16.

(5) When the set window period is began after the end of the vertical blanking period, the items of image data to be transferred are successively outputted on the image data-dedicated bus and picked up and written in the image memory provided for saving the image data. If three channels of the bus dedicated to the image data are used simultaneously for the three colors R, G and B, then transfer will be completed in a single vertical synchronization cycle.

(6) If two or more cells are present in a single imaged frame, it will be required to repeat the steps (1) through (5) a number of times corresponding to the number of cell images that are to be saved.

This transfer method represents an advancement over Prior-Art Method I since the master controller & processor is not subjected to a load, while the advantage of the bus dedicated to the image data can be fully exploited. Nevertheless, this transfer method still possesses the following shortcomings:

(a) One-sixtieth of a second is required to transfer an image area, no matter how small.

(b) If two or more cell images to be saved are present in a single imaged frame, the time required to save these cell images will be one-sixtieth of a second multiplied by the number of images. This will make it impossible to execute realtime processing, by way of pipeline processing and parallel processing, of images captured every one-sixtieth of a second.

(c) It is necessary for the master controller & processor to sequentially manage the computation of memory addresses to which data is transferred, as well as the pages of memory when classifying and saving each cell image.

OBJECT OF THE INVENTION

An object of the present invention is to solve the foregoing problems involved in cell image extraction, transfer and saving processing as performed by the Conventional methods, thereby making it possible to realize, at low cost, realtime processing of an imaged frame that changes every one-sixtieth of a second, even when a plurality of cell images are contained in a single frame.

According to the present invention, the foregoing object is attained by providing a processing apparatus for extracting and memorizing cell images, comprising: image capture means for forming an original cell image field; window means for extracting individual cell images by windows from the original cell image field formed by the image capture means; and an editing memory for storing the individual cell images extracted by the window means; wherein the window means including: a window setting memory having storage areas corresponding to positions of pixels on the original cell image field, the pixels forming the original cell image field; and means operative, when limits of the windows are set, for storing window setting data in the storage areas that correspond to starting and end points of the windows on the original cell image field on a window-by-window basis.

In another aspect of the invention, there is provided a processing apparatus for extracting and memorizing cell images, comprising: image capture means for forming an original cell image field; window means for extracting individual cell images by windows from the original cell image field formed by the image capture means; an editing memory for storing the individual cell images extracted by the window means; and a master controller for controlling storage process of the individual cell images in the editing memory; wherein a slave side controlled by the master controller has at least: (a) a window setting memory for storing, on the basis of position information indicative of positions of pixels forming the original cell image field, positions of the windows in the original cell image field on a window-by-window basis; (b) a window extraction timing control circuit for detecting, in synchronization with a scanning signal for scanning the image field, extraction timings of each window based on data in the window setting memory; (c) an addressing circuit for designating storage addresses of each of the windows in the editing memory; and (d) control means for performing control based on an output from the window extraction timing control circuit and an address designation from the addressing circuit in such a manner that individual cell images in respective ones of the windows are stored in the form of pixel data in the editing memory.

According to still another aspect of the invention, there is provided a cell image extracting and memorizing processing apparatus for extracting individual cell images by window means, from an original cell image field formed by image capture means, classifying cell image into a plurality of types according to cell image size in advance, and storing the individual cell images of the windows of predetermined types on predetermined pages of an editing memory having a plurality of pages, comprising: (a) first control means for detecting the sizes of the windows of the individual cell images in the original cell image field as well as the pages storing the individual cell images; (b) first memory means for storing data from the first control means as predetermined data; (c) a window setting memory for storing, on the basis of position information indicative of positions of pixels forming the original cell image field, positions of the windows in the original cell image field on a window-by-window basis; (d) a window extraction timing control circuit for detecting, in synchronization with a scanning signal for scanning the image field, extraction timings of each window based on data in the window setting memory; (e) page code generating means for detecting, based on the predetermined data, the pages storing the windows the extraction timings of which have been detected; (f) addressing means for designating storage addresses of the windows on the pages of the editing memory; and (g) second control means for performing control based on an output from the window extraction timing control circuit and an address designation from the addressing circuit in such a manner that individual cell images in respective ones of the windows are stored in the form of pixel data in the pages of the editing memory.

In a preferred embodiment of the invention, the addressing circuit comprises: (a) leading address means for computing and designating leading addresses of storage addresses on the pages based on an output from cell number counting means, which is for counting the number of individual cell images already stored on each of the pages, and sizes of the windows determined from the predetermined data; and (b) storage address generating means to which the leading addresses are inputted for successively designating positions at which the individual cell images are stored, per pixel, from positions of the leading addresses of the pages.

Furhter, according to the present invention, there is provided a processing method for extracting individual cell images by windows from an original imaged frame and storing the individual cell images in an editing memory, characterized by having an address table for generating a leading address of the editing memory which will prevail when a subsequent cell image data is stored, the leading address being generated using the following information (a) through (c): (a) the number of cell images already stored on one page of the editing memory; (b) the size of a window; and (c) the method of arraying the individual cell images on one page.

In another aspect of the invention, there is provided a processing method for extracting individual cell images by windows from an original imaged frame and storing the individual cell images in an editing memory, comprising the steps of: setting, by using a window setting memory, a window which extracts each individual cell image; picking up individual cell image data in accordance with the window via an image data bus; generating a leading address of the editing memory which prevails when an individual cell image is stored; and successively storing the picked-up data per pixel from the position of the leading address of the editing memory.

In a further aspect of the invention, there is provided a processing method for extracting individual cell images by windows from an original imaged frame and storing the individual cell images according to cell type on pages of an editing memory having a plurality of pages, comprising the steps of: setting sizes of the individual cell images stored on the pages of the editing memory; setting pages on which individual cell images in the imaged frame are stored; setting by using a window setting memory, a window which extracts each individual cell image; picking up individual cell image data in accordance with the window via an image data bus; generating a leading address of the editing memory which prevails when an individual cell image is stored; and successively storing the picked-up data one pixel at a time from the position of the leading address of the editing memory.

In accordance with the processing method and apparatus for extracting and memorizing cell images in accordance with the invention, the images of individual cells in an original imaged frame are extracted by windows and stored in the editing memory, in the process of which a window setting memory is used for setting the windows. This makes it possible to store a number of cell images in a single vertical synchronization cycle. Furthermore, since the leading addresses of the editing memory when the cell images are stored are automatically generated by the address table depending upon the number of cell images that have been stored in the editing memory, the cell images are stored without subjecting the master controller & processor to any load. Moreover, in a case where the editing memory has a plurality of pages, the cells are classified and the cell images are stored upon designating image size, a page code and an image size code are generated within the memory board on a cell image-by-image basis, leading addresses of the editing memory are generated automatically from the address table based on these codes and the number of cell images stored on each page, and cell images are stored without burdening the master controller & processor.

The invention has a number of advantages, as set forth below:

1. Using memories for the purpose of setting windows makes it possible to classify and save a large number of cell images in a single vertical synchronization cycle by means of a simpler circuit arrangement.

2. The master controller & processor need only set the extraction limits of the area of each cell image in the original imaged frame and the page of the editing memory that is to save this image; it is unnecessary for the master controller & processor to perform management and control for the purpose of computing memory addresses that are to write (save) transferred data and for the purpose of saving several cell images on the same page, as is required of the master controller & processor in the prior art. As a result, the master controller & processor is subjected to a lighten burden and the limit on its processing capability does not restrict the overall processing capability of the image processing system. This makes it possible to fully exploit the features of the image data bus architecture.

3. By virtue of the two advantages mentioned above, realtime processing for imaged frames that change every one-sixtieth of a second can be implemented at low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view useful in describing the timings of a cell image area;

FIG. 5 is an explanatory view illustrating an example of an original imaged frame;

FIGS. 6 and 7 are explanatory views illustrating an example of the contents at various addresses of a window setting memory;

FIGS. 8(a), (b) are explanatory views illustrating methods of arraying cell images within a single page;

FIG. 9 is an explanatory view illustrating processing for extracting and memorizing a number of cell images contained in an original imaged frame;

FIG. 13 is an explanatory view illustrating a processing method for extracting and memorizing cell images according to a Prior-Art Method II.

DETAILED DESCRIPTION OF THE INVENTION

A method and apparates for cell image processing in accordance with the present invention will now be described in detail with reference to the drawings.

Figure 2:
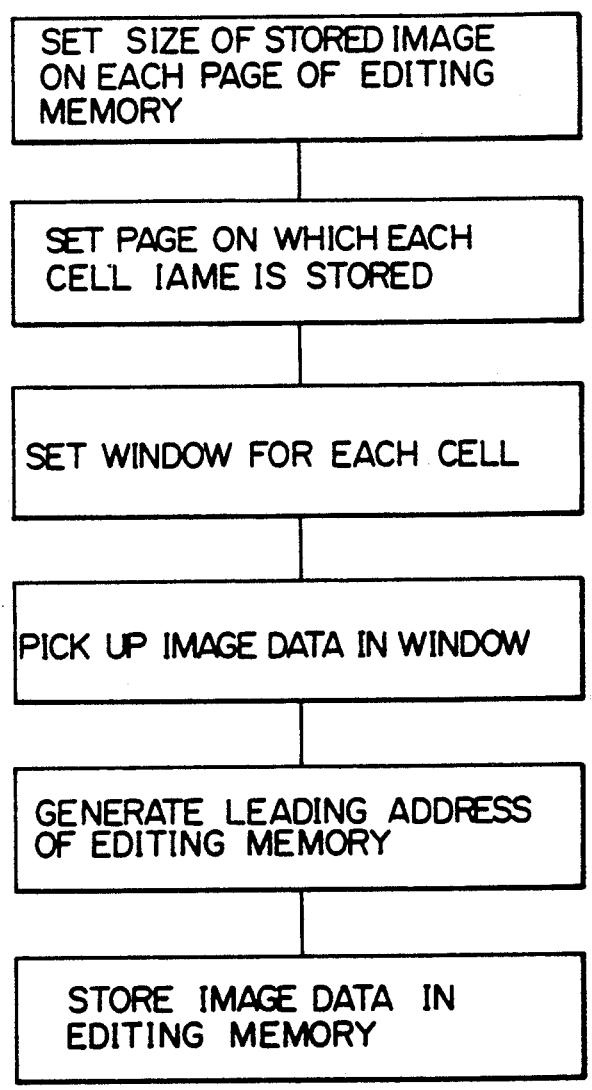
FIG. 2 is a flowchart illustrating the overall flow of a processing method for extracting and memorizing cell images according to the present invention.

FIG. 2 is simple flowchart illustrating the overall flow of the cell image extracting and memorizing processing method of the invention.

Figure 1:
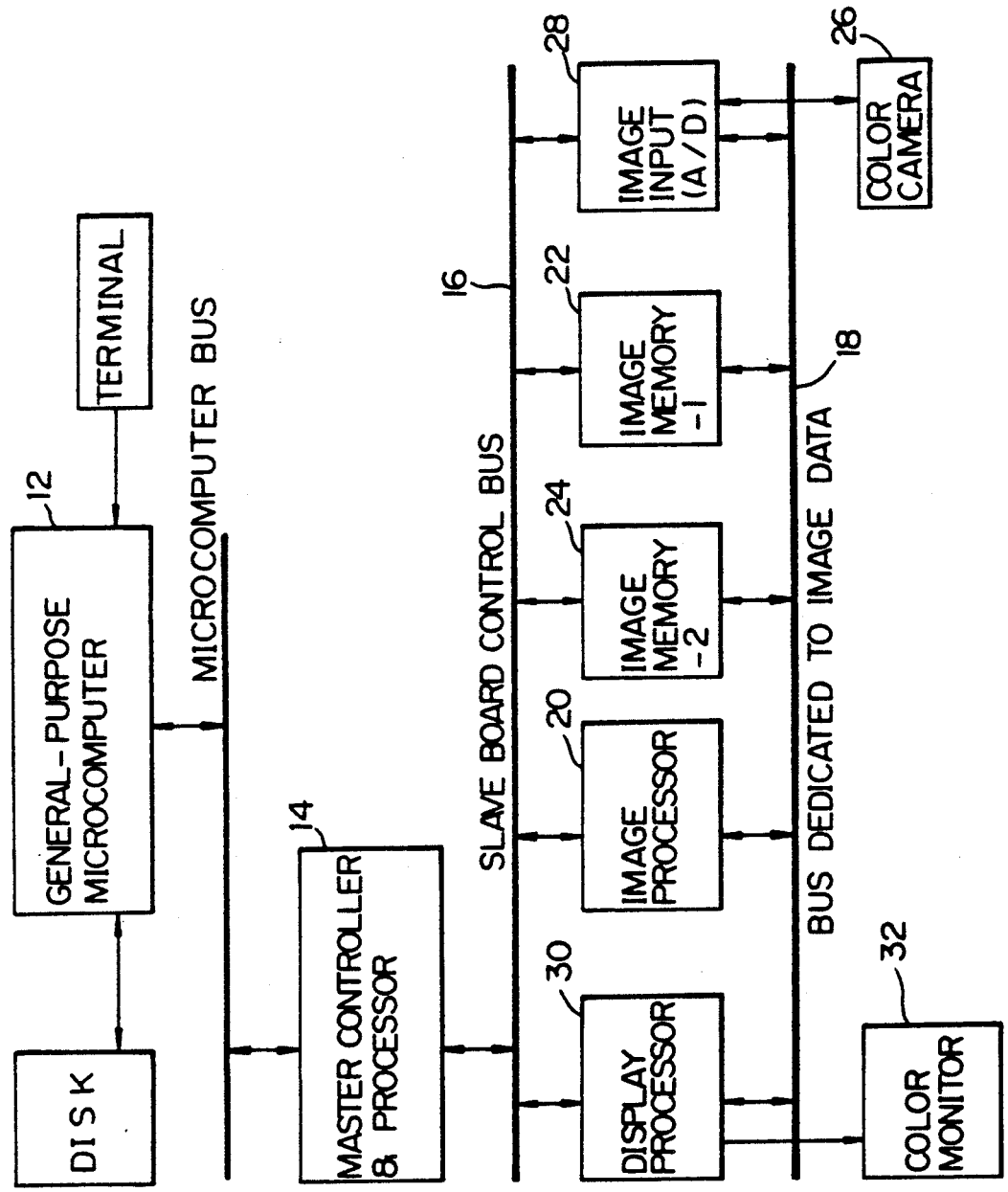
FIG. 1 is a block diagram illustrating an example of an image processing apparatus having a bus dedicated to image data.
Figure 3B:
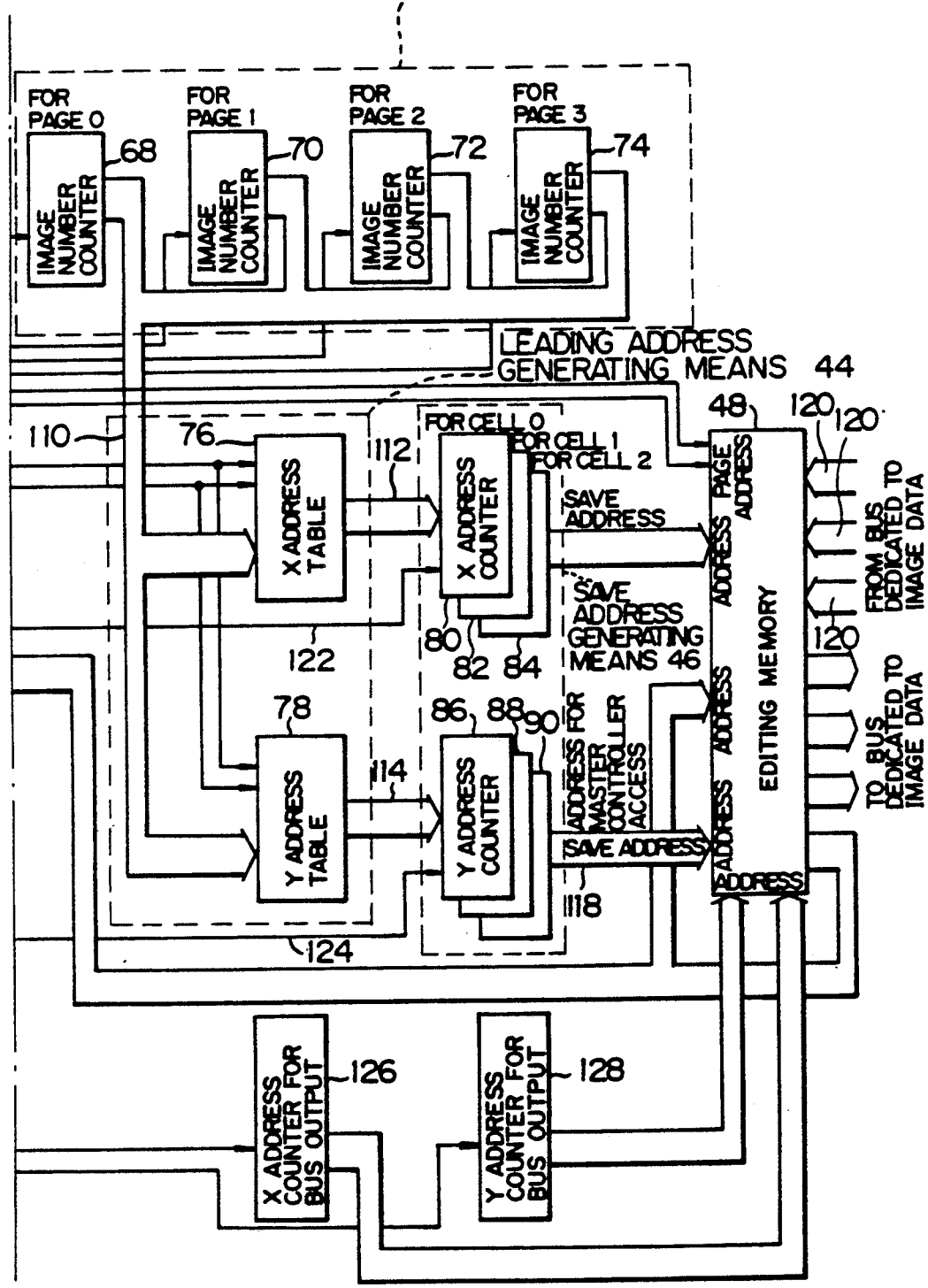
FIG. 3 is a block diagram illustrating the construction of a memory board used in the embodiment of the invention.
Figure 10:
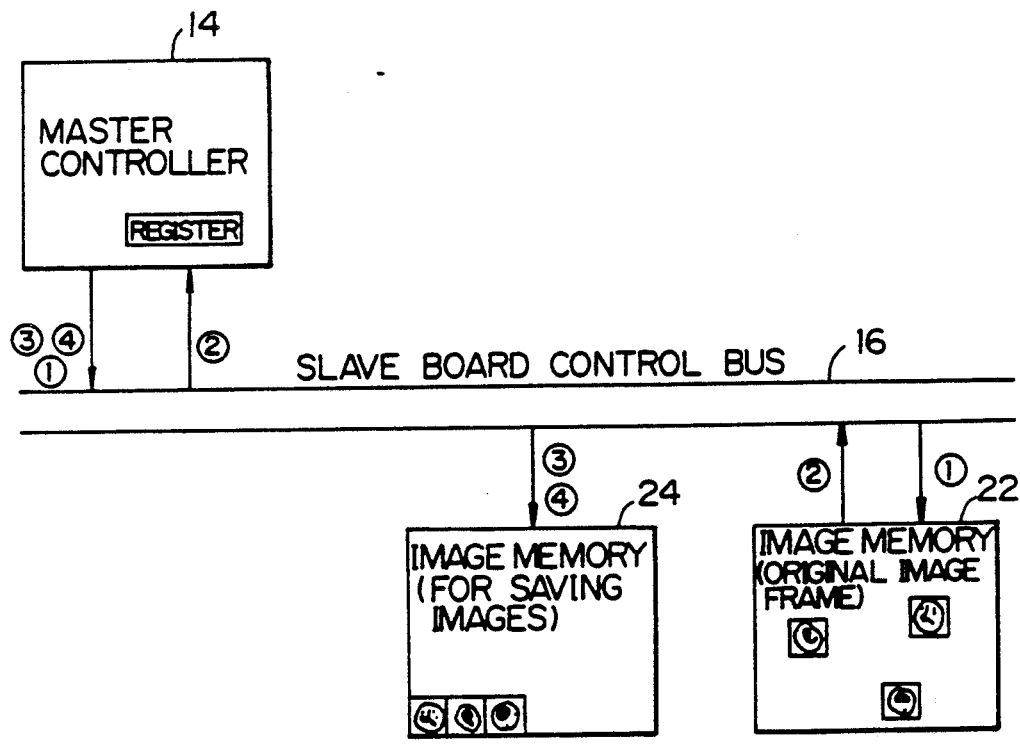
FIG. 10 is an explanatory view illustrating a processing method for extracting and memorizing cell images according to a Prior-Art Method I.
Figure 11:
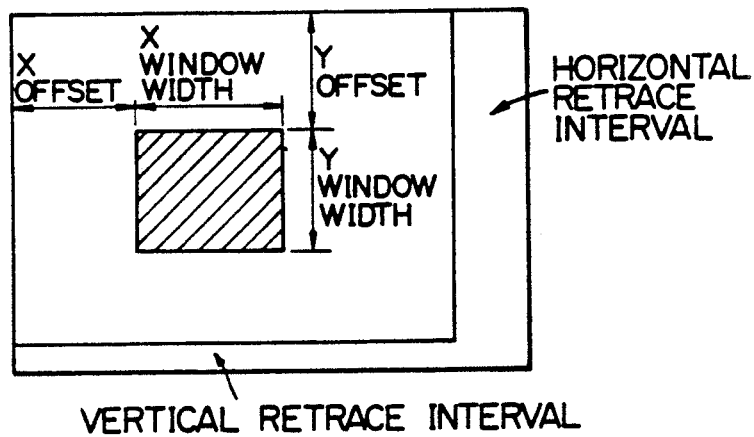
FIG. 11 is an explanatory view illustrating a window.
Figure 12:
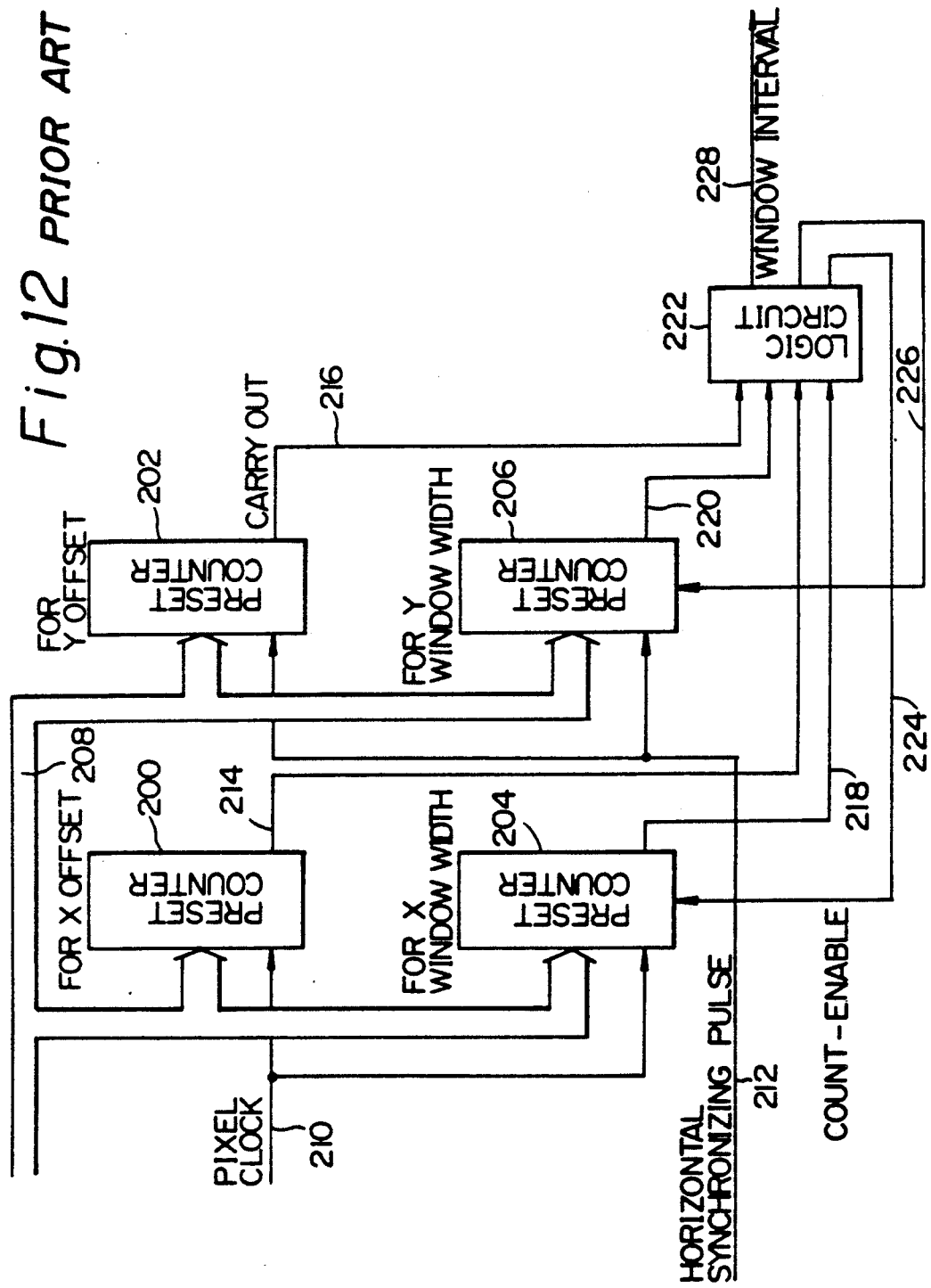
FIG. 12 is a block diagram illustrating a prior-art example through which a window function is implemented.

FIG. 3 is a block diagram illustrating the principal components of a memory board 34 in an embodiment of the present invention. This memory board can be substituted for the image memory board 24 shown in FIG. 1 or installed separately of the image memory board 24. In either case, it is arranged in parallel with the other slave boards.

Broken down into its principal sections, the memory board 34 of this embodiment comprises window setting means 36, page code generating means 38, image size code generating means 40, image number counting means 42, leading address generating means 44, save address generating means 46 and an editing memory 48.

The window setting means 36 comprises an X timing counter, a Y timing counter 52, window setting memories 54, 56, and a timing control circuit 58. The page code generating means 38 includes a page setting register 60 and a code selector 62. The image size code generating means 40 comprises an image size setting register 64 and a code selector 66. The image number counting means 42 is composed of image number counters 68, 70, 72, 74. The leading address generating means 44 includes an X address table 76 and a Y address table 78. The save address generating means 46 comprises X address counters 80, 82, 84 and Y address counters 86, 88, 90.

The editing memory 48 is divided into pages according to the classes of the cells. The classified cell images are stored (saved) in this memory upon being edited on respective pages of the memory. A "page" as referred to here corresponds to one frame or screen when it is displayed on the monitor 32. In the illustrated embodiment, the editing memory 48 is divided into four pages.

The controller & processor 14, which ascertains the area in which each cell is present in the original imaged frame as well as the classes of these cells by performing the edge tracing of each cell in accordance with the conventional method described above, sets the following in the memory board 34 via the slave board control bus 16:

(1) The size of the cell image saved on each page of the editing memory 48 is set in the image size setting register 64 on a page-by-page basis. In the illustrated embodiment, the arrangement is such that cell image size can be selected from rectangular image sizes of four types. The cell image size saved on each page is set as a two-bit image size code.

(2) Data as to which page of the editing memory 48 each cell image is to be saved in accordance with its class is set in the page setting register 60 on a cell-by-cell basis. In the present embodiment, data as to which of the four pages a cell image is to be saved can be set with regard to each of the cell images up to a maximum of three per one imaged frame. This setting is performed in the form of a two-bit page code for each and every cell.

(3) The position occupied by each cell in the original imaged frame is set in the window setting memories 54, 56 in accordance with the image size.

i. The x-direction timing value and Y-direction timing value (FIG. 4) corresponding to the pixel at the upper left-hand corner of the cell image area desired to be saved are supplied as addresses of the window setting memories 54 and 56, and a predetermined bit at this address of each memory is set so as to become logical "1". In the illustrated embodiment, each address is composed of four bits, three of which are made to correspond to each cell in one frame and the remaining one of which is assigned as a display window control bit when a display for saved images is made on the monitor 32 via the bus 18 dedicated to image data.

ii. Next, the X- and Y-direction timing values correresponding to the pixel at the lower right-hand corner of the cell image area desired to be saved are supplied as addresses of the window setting memories 54 and 56, and a predetermined bit at this address of each memory is set so as to become logical "1".

A specific example of the setting made in (3) above will be described based on FIGS. 5, 6 and 7. FIG. 5 is a view illustrating an example of an original imaged frame, FIG. 6 is a view illustrating an example of the contents at each address of the window setting memory 54, and FIG. 7 is a view illustrating an example of the contents at each address of the window setting memory 56.

With reference to FIG. 5, cell images of three cells 0, 1 and 2 are displayed. The image size of cell 0 is taken as being equivalent to 100 pixels horizontally and vertically, that of cell 1 is taken as being equivalent to 80 pixels horizontally and vertically, and that of cell 2 is taken as being equivalent to 60 pixels horizontally and vertically. In FIG. 5, the horizontal direction is expressed in the form of X coordinates and the vertical direction in the form of Y coordinates, and the coordinates of each pixel are expressed by (X,Y). Furthermore, the point at the upper left of the screen is taken as the origin (0,0), and the coordinates of the points at the four corners of each cell image are indicated.

A bit D0 of the window setting memories 54, 56 is used for cell 0, a bit D1 for cell 1, and a bit D2 for cell 2. The window setting memory 54 is for setting the X coordinate, and the window setting memory 56 is for setting the Y coordinate.

First, by implementing i of step (3) set forth above, logical "1" is set at D0 of address X=100 and at address Y=80 of the window setting memories to conform to the coordinates (100,80) of the point at the upper left of cell 0; logical "1" is set at D1 of address X=400 and at address Y=150 of the window setting memories to conform to the coordinates (400,150) of the point at the upper left of cell 1; and logical "1" is set at D2 of address X=180 and at address Y=280 of the window setting memories to conform to the coordinates (180,280) of the point at the upper left of cell 2.

Next, by implementing ii of step (3) set forth above, logical "1" is set at D0 of address X=200 and at address Y=180 of the window setting memories to conform to the coordinates (200,180) of the point at the lower right of cell 0; logical "1" is set at D1 of address X=480 and at address Y=230 of the window setting memories to conform to the coordinates (480,230) of the point at the lower right of cell 1; and logical "1" is set at D2 of address X=240 and at address Y=340 of the window setting memories to conform to the coordinates (240,340) of the point at the lower right of cell 2.

The settings performed at steps (1) through (3) are carried out in the vertical blanking period. When this period ends, the image data is outputted on the image data bus 18 from the image memory board 22 storing the original image. The flow of data on the bus 18 is the same as that in a television raster scanning manner. The manner in which a cell image is saved in accordance with the present embodiment will now be described based on the block diagram of FIG. 3.

As mentioned earlier, the window setting means 36 is provided with the X timing counter 50 and Y timing counter 52, which are reset by a horizontal synchronizing pulse and vertical synchronizing pulse, respectively, though the signal lines for these pulses are not shown in FIG. 3. The X timing counter 50 and Y timing counter 52 are counted up by the pixel clock and horizontal synchronizing pulse, respectively, and the outputs thereof are supplied as the addresses of the window setting memories 54, 56, respectively. Accordingly, when the cell image timing set at step (3) above arrive, the window setting memories 54, 56 output, from whichever of the output lines are for the cells 0, 1 and 2, the data "1" of the corresponding bits. For example, if the timings are for the coordinates (100,80) in FIG. 5, the bit D0 of the addresses designated by the window setting memories 54, 56 will be "1", so that a "1" is outputted from the output lines 92, 94 (cell 0) for the cell 0.

Next, the timing control circuit 58 receives the above-mentioned signals from the window setting memories 54, 56, determines which cell image the timing represent and delivers a cell number code to the code selector 62 via line 96. Meanwhile, the code selector 62 is being provided by the page setting register 60 with a page code indicating which page of the editing memory 48 is to save each cell image. Therefore, when the cell number code is applied to the code selector 62, the latter outputs, on lines 98, 100, a two-bit page code designating the page that is to save the cell image.

The page code is delivered to the size code selector 66 and timing control circuit 58 via a decoder 102 and line 104. The size code selector 66 is being provided by the page setting register 64 with an image size code indicating the image size of the cell image saved on each page of the editing memory 48, which page of the editing memory 48 is to save each cell image. Therefore, when the page code is applied to the size code selector 66, the latter outputs, on lines 106, 108, a two-bit image size code designating the image size saved on the particular page.

Meanwhile, the timing control circuit 58, which has received the page code via the line 104, increments (by +1) the value of the count recorded in image number counter (68, 70, 72 or 74) for the page designated by the page code. The image number counters 68, 70, 72, 74 respectively count the number of cell images saved on pages 0, 1, 2, 3 of the editing memory.

The counted values recorded in the cell number counters are supplied to the X address table 76 and Y address table 78 via line 110. Also, the image size code is supplied to the X address table 76 and Y address table 78 via lines 106, 108. These address tables store, in the form of numerical tables, the leading addresses of the editing memory page that is to save the next cell image, these addresses being computed in advance in accordance with the number of cell images saved on this page of the editing memory, the size of the image and the manner in which the images are arrayed. For example, if image size is 64×64 pixels and three cell images have already been saved in one page, then the X address table 76 and Y address table 78 will output the data "192" and "0" on lines 112, 114, respectively, as the memory addresses at which the first pixel of the next cell image is to be saved. It should be noted that these are examples of numerical values for a case where cell images are saved in one page of the editing memory when the array is as shown in FIG. 8(a). If the array is changed, as shown in FIG. 8(b), then naturally the data outputted on the lines 112, 114 will also change.

The outputs of the X address table 76 and Y address table 78 are inputted to the save address generator 46 composed of the X address counters 80, 82, 84 and Y address counters 86, 88, 90, thereby presetting the values of the counts in these address counters. The counters 80, 86 are used for the cell 0, the counters 82, 88 for the cell 1, and the counters 84, 90 for the cell 2. When a cell number code is delivered from the timing control circuit 58 to the save address generating means 46 via a line, not shown, one of the counter sets 80, 86; 82, 88; 84, 90 is selected, depending upon the cell number, and the data from the X address table 76 and Y address table 78 enters the selected set. By way of example, if the cell number is 0, the data from the X address table 76 enters the X address counter 80 and the data from the Y address table 78 enters the Y address counter 86, thereby setting the values of the counts within these counters. It should be noted that an X address counter is not always necessary for each and every cell, it being possible to make a single X address counter suffice. In order to simplify the arrangement of the circuitry, one X address counter is provided for each cell in the illustrated embodiment.

The above-mentioned preset values of the X and Y address counters are supplied as save addresses to the address lines of the editing memory 48 via lines 116, 118, respectively. The above-mentioned page code is applied to the page address lines of the editing memory 48 via lines 98, 100. Accordingly, on what page of the editing memory and from what memory address of this page the saving of a cell image is to start is designated by the page code and the save addresses. Since the image data of those pixels in the original imaged frame that are desired to be saved is being received at this time from lines 120 connected to the image data-dedicated bus 18, this image data is written in as the contents of the designated memory addresses mentioned above.

Thereafter, the X address counters are counted up pixel by pixel by the pixel clock pulses supplied from line 122, and the count values are successively supplied to the editing memory 48 as save addresses. The X address counters continue counting up the pixel clock pulses until the arrival of the X-direction timings at which the cell image areas end on each horizontal line. For example, in the case of cell 0 in FIG. 5, the value corresponding to X=100 is preset in the X address counter 80, and this counter continues counting up pulses until X=200 is attained. During the up-counting operation, the image data for this cell is saved in the editing memory 48. When the pixel X=200 is reached, image data composed of pixels beyond pixel X=201 is no longer saved in editing memory 48 owing to the action of timing control circuit 58. This circuit operates in accordance with a "1" on line 92, which is outputted on this line because a "1" will have been written in bit D0 of address X=200 of window setting memory 54, as shown in FIG. 6. In the case of the example mentioned above, the X address counter 80 is preset to the value supplied from the X address table 76 at every time X=100 on each horizontal line in response to a trigger from the timing control circuit 58, this taking place from Y=80 to Y=180, which is the Y-direction image area of cell 0. In a case where there are a plurality of cell image areas on the same horizontal line, as in the case of the horizontal line at Y=150 of FIG. 5, saving of cell image 0 is halted at X=200, after which the image data from X=400 to X=480 is saved in editing memory 48 as the image data of cell 1. The save address supplied to the editing memory 48 at this time comes from the X address counter 82.

The Y address counter are counted up by the horizontal synchronizing pulses supplied from line 124. In the case of cell 0 in FIG. 5, the value corresponding to Y=80 is preset in the Y address counter 86, and this counter continues counting up pulses until Y=180 is attained. During this time the image data from X=100 to X=200 is saved in the editing memory 48. When Y=180 is reached, image data composed of pixels beyond Y=181 is no longer saved in editing memory 48 as cell 0 owing to the action of timing control circuit 58. This circuit operates in accordance with a "1" on line 94, which is outputted on this line because a "1" will have been written in bit D0 of address Y=180 of window setting memory 56, as shown in FIG. 7. With regard to cell 1, the corresponding save addresses from Y=150 to Y=230 are supplied to the editing memory 48 from the Y address counter 88, and image data from X=400 to X=280 is saved during this time.

When all of the image data of one original imaged frame thus flows on the bus 180 dedicated to image data, a maximum of three cell images are saved in the editing memory 48 in a single vertical synchronization cycle in accordance with the illustrated embodiment.

Though the arrangement is not shown in FIG. 3, it is also possible for the master controller & processor 14 to read, via the slave board control bus 16, the saved number of images on each page outputted by the image number counting means 42. It is also possible to assign one bit in the output of the address table as a status bit indicating overflow of the number of images capable of being saved in one page of the editing memory, with this information being read by the master controller & processor.

Images saved in the editing memory 48 according to the classes of the cells as set forth above can be displayed on the monitor 32. This is implemented by setting, in the page setting register 60, the number of the page in the editing memory that is desired to be displayed, setting the display area (the X- and Y-direction timings) on the monitor 32 in the window setting memories, causing the image data on this page to flow out on the bus 18 dedicated to the image data, and feeding this image data into the display processor board. An X address counter 126 for the bus output and a Y address counter 128 for the bus output are counted up in regular order from 0 when the display start timing arrives, and the outputs thereof serve as addresses for the page in the editing memory 48 that is desired to be displayed.

The number of cell images which can be saved in one vertical synchronization cycle and the number of pages of the editing memory can be changed in simple manner by slightly modifying the circuit shown in FIG. 3.

Further, in a case where cells are not classified and image size is taken as being constant at all times, the page code generating means 38 and image size code generating means 40 can be dispensed with and only one image number counter will suffice.

As many apparently widely different embodiments of the present invention can be made without departing from the spirit and scope thereof, it is to be understood that the invention is not limited to the specific embodiments thereof except as defined in the appended claims.

What is claimed is:

1. A cell image extracting and memorizing processing apparatus for extracting individual cell images by window means, from an original cell image field formed by image capture means, classifying cell image into a plurality of types according to cell image size in advance, and storing the individual cell images of the windows of predetermined types on predetermined pages of an editing memory having a plurality of pages, comprising:
   (a) first control means for detecting the sizes of the windows of the individual cell images in the original cell image field as well as the pages storing said individual cell images;
   (b) first memory means for storing data from said first control means as predetermined data;
   (c) a window setting memory for storing, on the basis of position information indicative of positions of pixels forming the original cell image field, positions of the windows in the original cell image field on a window-by-window basis;
   (d) a window extraction timing control circuit for detecting, in synchronization with a scanning signal for scanning the image field, extraction timings of each window based on data in said window setting memory;
   (e) page code generating means for detecting, based on the predetermined data, said pages storing said windows the extraction timings of which have been detected;
   (f) addressing means for designating storage addresses of said windows on said pages of said editing memory; and
   (g) second control means for performing control based on an output from said window extraction timing control circuit and an address designation from said addressing circuit in such a manner that individual cell images in respective ones of the windows are stored in the form of pixel data in the pages of said editing memory.

2. The apparatus according to claim 1, wherein said addressing circuit comprises:
   (a) leading address means for computing and designating leading addresses of storage addresses on said pages based on an output from cell number counting means, which is for counting the number of individual cell images already stored on each of said pages, and sizes of said windows determined from the predetermined data; and
   (b) storage address generating means to which said leading addresses are inputted for successively designating positions at which the individual cell images are stored, per pixel, from positions of said leading addresses of said pages.

* * * * *